United States Patent
Swift et al.

(10) Patent No.: US 8,851,849 B2
(45) Date of Patent: Oct. 7, 2014

(54) PROPELLER ASSEMBLY PITCH CHANGE APPARATUS

(75) Inventors: Andrew Swift, Uttoxeter (GB); Antony Morgan, Wolverhampton (GB)

(73) Assignee: Rolls-Royce PLC, London (GB)

( * ) Notice: Subject to any disclaimer, the term of this patent is extended or adjusted under 35 U.S.C. 154(b) by 986 days.

(21) Appl. No.: 12/954,782

(22) Filed: Nov. 26, 2010

(65) Prior Publication Data

US 2011/0164980 A1 Jul. 7, 2011

(30) Foreign Application Priority Data

Jan. 5, 2010 (GB) .................................. 1000054.5
Mar. 4, 2010 (GB) .................................. 1003561.6

(51) Int. Cl.
*B64C 11/28* (2006.01)
*B64C 11/32* (2006.01)

(52) U.S. Cl.
CPC . *B64C 11/32* (2013.01); *Y02T 50/66* (2013.01)
USPC ...................................................... 416/165

(58) Field of Classification Search
USPC ................ 416/26, 27, 44, 46, 164, 165, 140; 92/24, 26, 27, 28
See application file for complete search history.

(56) References Cited

U.S. PATENT DOCUMENTS

| | | |
|---|---|---|
| 2,541,636 A | 2/1951 | Chillson |
| 2,646,131 A | 7/1953 | Mergen et al. |
| 2,664,960 A | 1/1954 | Longfellow et al. |
| 3,003,567 A | 10/1961 | Flaugh et al. |
| 3,873,235 A | 3/1975 | Mendelson |
| 4,934,901 A | 6/1990 | Duchesneau |
| 2007/0212220 A1 * | 9/2007 | Perkinson et al. .............. 416/46 |

FOREIGN PATENT DOCUMENTS

| | | |
|---|---|---|
| EP | 0 394 183 A1 | 10/1990 |
| GB | 846811 | 8/1960 |
| GB | 2 197 912 A | 6/1988 |
| WO | WO 93/03258 | 2/1993 |

OTHER PUBLICATIONS

Nov. 15, 2013 European Search Report issued in European Application No. EP 10 19 2587.

* cited by examiner

*Primary Examiner* — Edward Look
*Assistant Examiner* — Maxime Adjagbe
(74) *Attorney, Agent, or Firm* — Oliff PLC

(57) ABSTRACT

A pitch change apparatus is provided for a propeller assembly having a row of propeller blades which rotate around an axis of the assembly. The apparatus has a unison ring which is coaxial with the propeller assembly. The unison ring is movable to drive respective mechanisms for varying the pitch of the blades. The apparatus further has a plurality of pitch lock assemblies circumferentially distributed around the unison ring. Each pitch lock assembly has a free state which allows movement of the unison ring and a locked state which prevents or limits movement of the unison ring and thus prevents or limits variation of the pitch of the blades. The pitch lock assembly moves from the free to the locked state when the assembly receives a signal to lock the blades.

20 Claims, 2 Drawing Sheets

PROPELLER ASSEMBLY PITCH CHANGE APPARATUS

FIELD OF THE INVENTION

The present invention relates to a pitch change apparatus for a propeller assembly.

BACKGROUND

Aero propellers, either single rotor or contra-rotating, usually have a means of varying the blade pitch via a pitch control mechanism (PCM). Blade pitch variation can optimise efficiency of thrust delivery whilst reducing noise throughout the flight envelope and provide reverse thrust. Further, by feathering of the blades, drag and rotor speed can be controlled in some failure cases. In particular, relative to a fine pitched propeller blade, a coarse pitched blade generally provides greater rotational resistance (which lowers engine RPMs) and provides less forward velocity drag resistance.

There are a number of established ways of configuring a PCM, but generally they all feature: a source of power, a prime mover, a mechanism from is prime mover to blade, and a failsafe system.

In the event of PCM failure, it may be desirable to move the blades to coarse to prevent dangerous increases in engine speed. In the event of engine failure, it may be likewise be desirable to move the blades to coarse to reduce aircraft gliding resistance. However, the combined effect of rotational and aerodynamic forces acting on the blades tends to urge the blades to fine. Thus PCMs usually have a failsafe arrangement for preventing undesirable pitch variation in the event of power loss failure.

FIG. 1 shows schematically a longitudinal cross-section through a prior art screw pitch lock apparatus for varying the pitch of a row of propeller blades of a propeller assembly. The apparatus comprises a hydraulic cylinder 1 and piston 2 which extend along the rotational axis X of the propeller blades 3 (only one of the propeller blades being shown in FIG. 1). The cylinder contains hydraulic fluid (e.g. oil), and a wall 4 fluidly seals the end of the cylinder. The piston divides the cylinder into two chambers 5, 6. By varying the fluid pressure difference between the two chambers, the piston can be moved to the left or the right along the axis X.

A quill 7 extends radially inwardly from the inboard end of each propeller blade 3 along the rotational axis Y of the blade, the quill connecting to an end of a crank arm 8 which has its other end in a respective retaining recess 9 formed at the end of the piston 2. By this mechanism, movement of the piston along the rotational axis X is converted into pitch-changing rotation of the blade about rotational axis Y.

The cylinder 1 is part of a larger housing which also provides a fixing arrangement 10 for the propeller blades 3 and a rotation drive input 11 for turning the propeller assembly. The drive input is typically connected to the output shaft of an engine gearbox. Hydraulic fluid for the chambers 5, 6 is provided by a fluid transmission tube 12 which extends axially from the drive input. A rotating fluid coupling 13 at the end of the tube allows fluid to be transmitted between the static and rotating fields.

A ball screw 14 (i.e. a screw with a plurality of balls located in the thread of the screw) extends along the rotational axis X, an end of the ball screw 14 being fixed by a hydraulically signalled brake 15 to the wall of the cylinder 1. A nut 16 which is axially and rotationally fixed relative to the piston 2 is threadingly engaged to balls of the ball screw. Lubricated in the hydraulic fluid, the balls provide a low friction threaded connection between the screw and the nut and offer little resistance to the axial movement of the piston in the cylinder whilst the pressurised de-activated brake allows the screw to rotate. However, in the event of fluid pressure loss, the brake activates and increases the frictional resistance to rotational movement of the screw, which restrains movement of the nut and piston and thereby prevents changes to the pitch of the propeller blades 3 in the fine direction.

Screw pitch lock apparatuses, such as the one shown in FIG. 1, require the propeller assembly to have a central zone along its rotational axis for installation of the apparatus. Generally, such a zone is available on single propeller engines where the propeller assembly is mounted to one side of the engine's drive gearbox. However, other engine arrangements, and particularly in-line arrangements, may not have this zone available. For example, EP A 1881176 describes a contra-rotating propeller engine with a pair of propeller blade assemblies which rotate in opposite directions as a result of association with a coaxial epicyclic gear assembly acting as a differential gearbox. The propeller assemblies are in the "pusher" configuration, with the free power turbine drive shaft, static support structure for the propeller assembly rotors and the gearbox occupying central space on the axis of the forward propeller assembly, and thereby rendering a centrally-located ball screw style pitch lock apparatus impractical for at least the forward propeller assembly.

Likewise, a centrally-located ball screw style pitch lock system would be impractical for the rear propeller assembly of a propeller engine with a pair of contra-rotating "puller" propeller blade assemblies driven by an in-line gear assembly.

SUMMARY OF THE INVENTION

Accordingly, an aim of the present invention is to provide a pitch change apparatus with pitch lock capability for a propeller assembly, particularly when the propeller assembly has little or no available space for such an apparatus in the zone centred on its rotational axis.

Thus a first aspect of the invention provides pitch change apparatus for a propeller assembly having a row of propeller blades which rotate around an axis of the assembly, the apparatus comprising:

a unison ring which is coaxial with the propeller assembly, the unison ring being movable to drive respective mechanisms for varying the pitch of the blades, and a plurality of pitch lock assemblies circumferentially distributed around the unison ring;

wherein each pitch lock assembly has a free state which allows movement of the unison ring and a locked state which prevents or limits movement of the unison ring and thus prevents or limits variation of the pitch of the blades, the pitch lock assembly moving from the free to the locked state when the assembly receives a signal to lock the blades.

Advantageously, the unison ring can be installed coaxially to the propeller assembly, but not in the central zone along its rotational axis. Likewise, the pitch lock assemblies circumferentially distributed around the unison ring are not required to be located in the central zone. Thus the apparatus can be used to control the pitch of the forward propeller assembly of a propeller engine with a pair of contra-rotating "pusher" propeller blade assemblies driven by an in-line gear assembly, or the rear propeller assembly of a propeller engine with a pair of contra-rotating "puller" propeller blade assemblies driven by an in-line gear assembly.

The plural pitch lock assemblies help to spread load around the unison ring. They also provide useful redundancy, whereby if a single pitch lock assembly fails or malfunctions, the remaining pitch lock assemblies can still operate to prevent or limit variation of the pitch of the blades.

The apparatus may have any one, or to the extent that they are compatible, any combination of the following optional features.

The pitch change apparatus may further comprise one or more actuators for moving the unison ring. For example, the actuators can be hydraulic or electrical actuators, e.g. of types known in the art.

Typically, the unison ring is movable in the axial direction to drive the respective mechanisms for varying the pitch of the blades. The mechanisms can be of known type. For example, each propeller blade can have quill extending radially inwardly from the inboard end of the blade, the unison ring being connected to the end of a respective crank which at the other end is joined to the quill, axial movement of the ring thereby being transformed by the crank into rotational movement of the quill and hence rotational movement of the blade.

Preferably, the pitch lock assemblies are maintained in the free state by the pressure of hydraulic fluid received from a hydraulic fluid supply, the signal to lock the blades being a drop of hydraulic pressure in the supply. If the same hydraulic fluid supply also supplies fluid to one or more hydraulic actuators for moving the unison ring, then a drop of hydraulic pressure in the supply that could cause the actuators to malfunction can also be the signal to move the pitch lock assemblies from the free to the locked state. For example, each pitch lock assembly can have a hydraulic piston which actuates the change from the free state to the locked state.

Each pitch lock assembly may have a respective connection member which joins the pitch lock assembly to the unison ring so that, in the free state, the pitch lock assemblies allow movement of the connection members and hence allow movement of the unison ring, and, in the locked state, the pitch lock assemblies prevent movement of the connection members relative to the pitch lock assemblies and hence prevent or limit movement of the unison ring. For example, the connection member can be a ball screw or a roller screw or similar threaded member which converts rotational torque into linear motion. Advantageously, ball screws and roller screws can provide very little frictional resistance to propeller blade pitch variation in the free state.

Preferably, the connection members, in the locked state, allow a predetermined amount of movement of the unison ring relative to the connection members, the predetermined amount of movement corresponding to a predetermined amount of variation in the pitch of the blades. For example, the predetermined amount of movement may correspond to no more than a ±0.5% variation in the pitch of the blades relative to the rotation required to move between fully fine and fully coarse. Small pitch variations can thus be performed without moving the connection members and hence without causing corresponding activity in the pitch lock assemblies. This can help to reduce wear in the pitch lock assemblies, for example during synchrophasing operations.

As mentioned above, the connection member of each pitch lock assembly can be a threaded member, such as a ball screw or roller screw. The threaded member is typically non-rotatably attached to the unison ring. A rotatable nut can be threadingly fitted to the threaded member, the nut carrying a first braking surface which, in the free state, is maintained a distance apart from a facing second braking surface carried by a non-rotatable portion of the pitch lock assembly. In the locked state, the first braking surface engages with the second braking surface to prevent rotation of the nut and hence prevent movement of the threaded member relative to the pitch lock assembly.

Preferably, the rotatable nut is biased towards engagement of the first braking surface with the second braking surface. The bias may be provided by one or more biasing elements such as springs. As mentioned above, each pitch lock assembly may have a hydraulic piston which actuates the change from the free state to the locked state. In the free state, the hydraulic piston can act against the bias on the nut to maintain the distance apart of the first braking surface and the second braking surface. However, in the locked state, a drop in hydraulic pressure in the piston can lead to the engagement of the first braking surface with the second braking surface.

The pitch lock assemblies may be configured to provide a leakage flow of lubricating fluid to components of the assembly, such as bearings, connection member and/or brake surfaces. Conveniently, the lubricating fluid may be hydraulic fluid, e.g. received from the hydraulic fluid supply when the pitch lock assemblies are maintained in the free state by the pressure of hydraulic fluid received from such a supply. Compared to a prior art screw pitch lock apparatus located on the axis of rotation of a propeller assembly, the pitch lock assemblies are typically positioned at a greater radial distance from the axis of rotation, and thus experience higher centrifugal force for a given rotational velocity. Providing a leakage flow of lubricating fluid can help to maintain the lubrication of the assemblies in this higher force environment.

Each pitch lock assembly may be mounted to a support element (for example a ring-shaped support element, coaxial with the propeller assembly) by a respective fastening system which allows movement of the pitch lock assembly relative to the support element, the fastening system biasing the pitch lock assembly into engagement with the support element such that, in the locked state, movement of the unison ring in a first direction corresponding to the direction of the bias is prevented by the engagement of the pitch lock assembly with the support element, while movement of the unison ring in the opposing second direction against the bias is permitted; whereby, if a pitch lock assembly inadvertently enters the locked state when the other pitch lock assemblies are in the free state, the locked pitch lock assembly can allow movement of the unison ring in the second direction. Typically, the movement of the unison ring in the second direction corresponds to variation of the pitch of the blades towards coarse. Thus the biased fastening system provides a means by which a malfunctioning pitch lock assembly can be overridden by the other pitch lock assemblies, and thus can allow the blades to be moved towards coarse to avoid e.g. excessive engine speed and/or reduce gliding resistance. The fastening system bias may be provided by one or more biasing elements such as springs.

Preferably, the fastening system bias of each pitch lock assembly is greater than any resistance generated in the pitch lock assembly during movement, in the free state, of the corresponding connection member. Thus, under normal operation, the assembly can remain engaged with the support element.

Preferably, the combined biases of the fastening systems of the pitch lock assemblies are such that, when all the pitch lock assemblies are in the locked state, movement of the unison ring in the opposing second direction against the direction of the bias is prevented. Thus when all the pitch lock assemblies are functioning normally, the fastening system biases do not allow unintentional pitch variation.

Each pitch lock assembly may have a respective sensor system which measures the state of the assembly. For example, the sensor system can measure any one or any combination of: the load on the assembly, the pressure of hydraulic fluid within the assembly, and the free or locked status of the assembly. Such measurements can be used to monitor the performance of the assemblies.

A second aspect of the invention provides a pitch lock assembly of the pitch change apparatus according to the first aspect. The pitch lock assembly may have any one, or to the extent that they are compatible, any combination of the relevant optional features of the first aspect.

As an example, a pitch lock assembly may have a connection member which, in use, joins the pitch lock assembly to a unison ring, the assembly having a free state which allows movement of the connection member and hence allows movement of the unison ring, and a locked state which prevents movement of the connection member relative to the pitch lock assembly and hence prevents or limits movement of the unison ring. The connection member, in the locked state, may allow a predetermined amount of movement of the unison ring relative to the connection member. The predetermined amount of movement typically corresponds to a predetermined amount of variation in the pitch of a row of propeller blades.

As a further example, a pitch lock assembly may have a fastening system for mounting the assembly to a support element, the fastening system allowing movement of the pitch lock assembly relative to the support element, but biasing the pitch lock assembly into engagement with the support element such that, in the locked state, movement of the unison ring in a first direction corresponding to the direction of the bias is prevented by the engagement of the pitch lock assembly with the support element, while movement of the unison ring in the opposing second direction against the bias is permitted; whereby, if the pitch lock assembly inadvertently enters the locked state, the assembly can be overridden to allow movement of the unison ring in the second direction.

As a further example, a pitch lock assembly may be configured to provide a leakage flow of lubricating fluid to components of the assembly.

A third aspect of the invention provides a propeller assembly having a pitch change apparatus according to the first aspect. In the propeller assembly, the pitch change apparatus may have any one, or to the extent that they are compatible, any combination of the optional features of the first aspect.

A fourth aspect of the invention provides an engine arrangement having:

a first propeller assembly having a pitch change apparatus according to the first aspect, is a gear assembly (such as an epicyclic gear assembly) that drives the first assembly, and a power drive shaft that connects to the gear assembly at a side thereof to drive the gear assembly;

wherein the first propeller assembly is connected to the gear assembly at said side thereof, the first propeller assembly and the pitch change apparatus being coaxial with the power drive shaft. In the engine arrangement, the pitch change apparatus may have any one, or to the extent that they are compatible, any combination of the optional features of the first aspect.

Typically, the engine arrangement is for a contra-rotating engine, and further has a second propeller assembly driven by the gear assembly and arranged to rotate in an opposite direction to the first propeller assembly. The second propeller assembly is typically connected to the gear assembly at an opposing side of the gear assembly.

A fifth aspect of the invention provides a gas turbine engine having an engine arrangement according to the fourth aspect, the engine comprising in flow series: (i) a generator section which includes one or more turbine subsections, one or more respective generator drive shafts extending axially forwardly from the turbine subsections to one or more corresponding generator compressor subsections, and (ii) a power turbine section, the power drive shaft extending axially from the power turbine section to drive the gear assembly.

For example, the power drive shaft can extending axially rearwardly for a "pusher" type engine arrangement, or can extending axially forwardly for a "puller" type engine arrangement.

A sixth aspect of the invention provides a pitch change apparatus for a propeller assembly having a row of propeller blades which rotate around an axis of the assembly, the apparatus comprising:

a drive element movable to drive respective mechanisms for varying the pitch of the blades, and one or more pitch lock assemblies, the, or each, pitch lock assembly having a free state which allows movement of the drive element and a locked state which limits movement of the drive element and thus limits variation of the pitch of the blades, the pitch lock assembly moving from the free to the locked state when the assembly receives a signal to lock the blades;

wherein the, or each, pitch lock assembly has a respective connection member which joins the pitch lock assembly to the drive element, the connection member allowing a predetermined amount of movement of the drive element relative to the connection member, the predetermined amount of movement corresponding to a predetermined amount of variation in the pitch of the blades, so that, in the free state, the pitch lock assembly allows movement of the connection member and hence allows movement of the drive element, and, in the locked state, the pitch lock assembly prevents movement of the connection member relative to the pitch lock assembly and hence limits the drive element to the predetermined amount of movement.

The pitch change apparatus can thus be an apparatus of the first aspect (i.e. the apparatus having a plurality of pitch lock assemblies, and the drive element being the unison ring). Alternatively, however, the apparatus can be of a different type. For example, the apparatus can be centrally-located on the rotational axis of the propeller blades. It may have only one pitch lock assembly.

As discussed above, by allowing in the locked state a predetermined amount of movement of the drive element relative to the connection member, small pitch variations can be performed without moving the, or each, connection member and hence without causing corresponding activity in the pitch lock assembly. This can help to reduce wear in the pitch lock assembly, for example during synchrophasing operations.

The predetermined amount of movement may correspond to no more than a ±0.5% variation in the pitch of the blades relative to the rotation required to move between fully fine and fully coarse. The connection member can be a ball screw or a roller screw or similar threaded member which converts rotational torque into linear motion.

BRIEF DESCRIPTION OF THE DRAWINGS

Embodiments of the invention will now be described by way of example with reference to the accompanying drawings in which.

DETAILED DESCRIPTION

Figure 1:
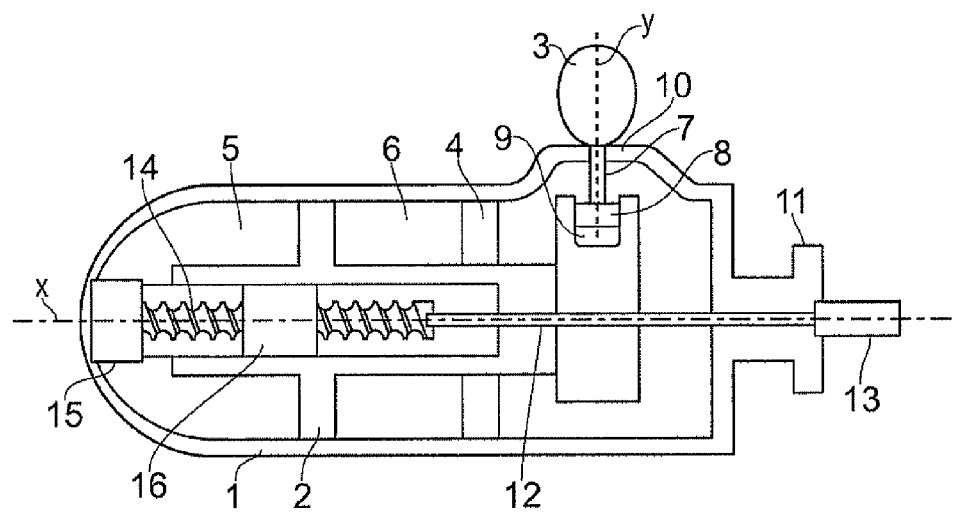
FIG. 1 shows schematically a longitudinal cross-section through a prior art screw pitch lock apparatus for varying the pitch of a row of propeller blades of a propeller assembly.
Figure 2:
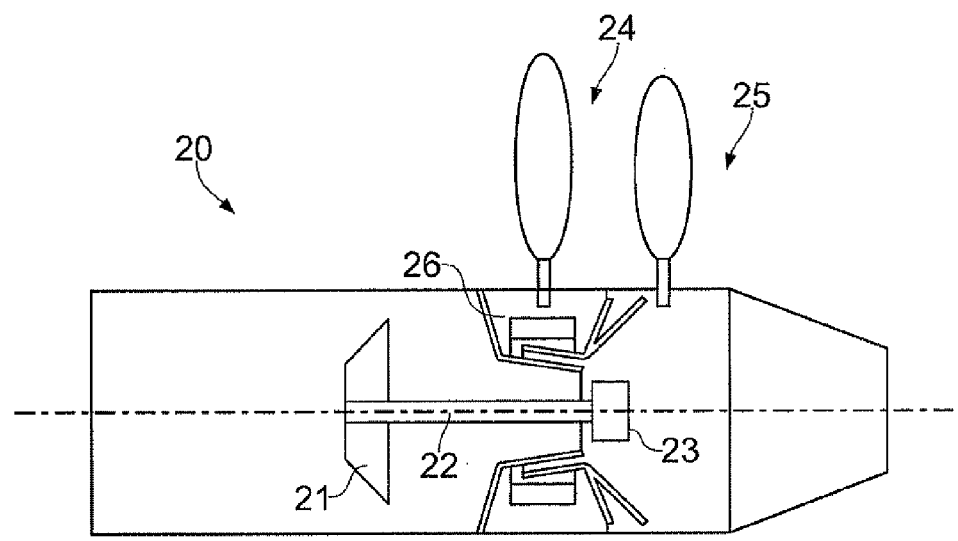
FIG. 2 shows schematically a longitudinal cross-section through a contra-rotating, open rotor, "pusher" engine.

FIG. 2 shows a schematic longitudinal cross-section through a contra-rotating, open rotor, "pusher" engine 20. The engine has a forward generator section (not shown). A free power turbine 21 is located downstream of the generator section. A power drive shaft 22 extends rearwardly from the free power turbine and connects to a front side an in-line gearbox 23, which may be of the epicyclic type. The gearbox drives front 24 and aft 25 contra-rotating propeller assemblies, each comprising a rotor and respective propeller blades. Support and drive structures for the propeller assemblies are indicated schematically by thick black lines. A pitch change apparatus for the front propeller assembly is provided in an annular zone 26 around the power drive shaft and support and drive structures.

Figure 3:
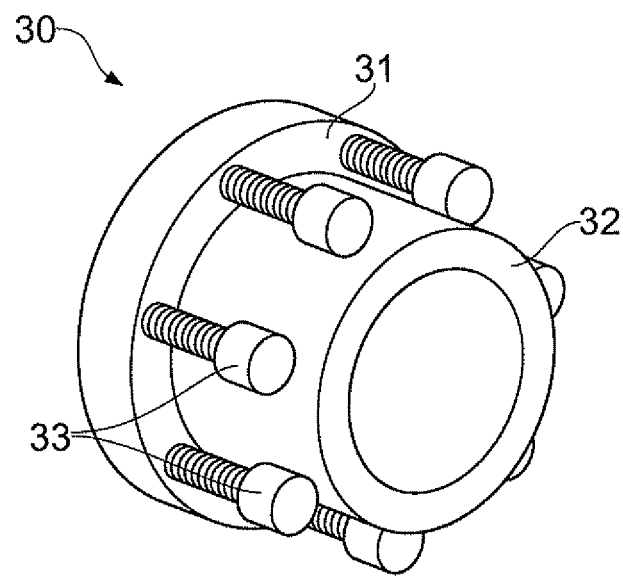
FIG. 3 shows schematically a perspective view of a pitch change apparatus for use in the engine of FIG. 2.

FIG. 3 shows schematically a perspective view of a pitch change apparatus 30 according to the present invention. The apparatus is suitable for locating in the annular zone 26 of the engine 20 of FIG. 2.

The apparatus 30 has a unison ring 31 which moves in the axial direction of the engine 20 under the control of a primary pitch change actuation system 32 which may comprise, for example, a number of circumferentially distributed hydraulic actuators. The actuators may be powered by a hydraulic power source, which can be located in a more distant, typically non-rotating, part of the engine. Suitable actuators are known to the skilled person. The unison ring drives respective mechanisms (not shown) for varying the pitch of the blades. The mechanisms can comprise, for example, crank arm and quill arrangements. Suitable mechanisms are known to the skilled person.

Circumferentially distributed around the unison ring 31 are a number of pitch lock assemblies 33 which can move between a free state and a locked state. In the free state, the assemblies allow movement of the unison ring 31. In the locked state, the assemblies prevent or limit movement of the unison ring, and thus prevent or limit pitch changes to the blades of the front propeller assembly 24. The number of assemblies allows good load spread and helps to reduce any offset loading to the unison ring. It also provides redundancy in case of single assembly creep or complete failure to react loads.

Figure 4:
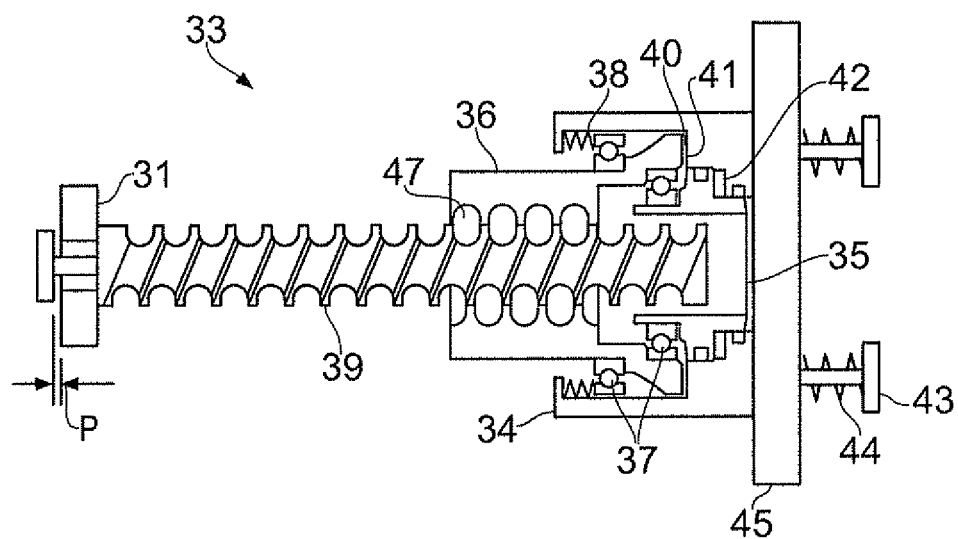
FIG. 4 shows schematically a longitudinal cross-section through a pitch lock assembly for use in the pitch change apparatus of FIG. 3.

FIG. 4 shows a schematic longitudinal cross-section through one of the pitch lock assemblies 33. The assembly has a housing 34 in which a hydraulic piston 35 positions a ball screw nut 36 via a pair of bearings 37 reacting against preload bias springs 38. The nut is rotatably mounted to a ball screw 39 via the balls 47 of the ball screw, the balls rolling in the grooves of complementary threads formed in the ball screw and the nut. The ball screw extends away from the housing to form a non-rotatable connection with the unison ring 31.

The nut has an integral brake plate 40. In the free state, hydraulic pressure exerted by hydraulic fluid in annular chamber 42 formed between housing 34 and piston 35 acts on the nut 36 and produces a finite gap between the brake plate 40 and a facing brake surface 41 of the housing, allowing free rotation of the nut and thus free translation of the ball screw 39 to follow axial movement of the unison ring under the control of the primary pitch change actuation system 32. If necessary, further brake plates and corresponding brake surfaces can be provided, e.g. in facing pairs axially spaced along the nut and the housing.

In the locked state, the hydraulic pressure is removed and any attempted axial movement of the unison ring 31 to the right in FIG. 4 (corresponding to the blade fine direction) will, under the preload springs 38 and assisted by ball screw 39 to nut 36 rotational friction forces, result in the gap between the brake plate 40 and the facing brake surface 41 being removed. This stops any further nut rotation and thus prevents unison ring translation.

Thus a drop in hydraulic pressure acts as a signal to the pitch lock assemblies 33 to move to the locked state. The hydraulic pressure can be supplied by the same power source that powers hydraulic actuators of the pitch change actuation system 32. In this way, interruption of the supply of hydraulic pressure to the actuators can also cause the pitch lock assemblies to prevent the propeller blades moving to fine.

The pitch lock assemblies 33 can be configured to allow installation in a range of available mounting zones 26. Each assembly may have further features. For example, to improve reliability and reduce wear, continuous leakage flow of hydraulic fluid to the surfaces of the ball screw 39, bearings 37 and brake 40, 41 can be provided. This has an added advantage of automatically bleeding air within the hydraulic lines that transmit hydraulic fluid to the assemblies, thereby increasing assembly reaction times and assisting the load spread between the various locks.

The connection of the ball screw 39 to the unison ring 31 may allow a small amount of relative translation movement of the unison ring, e.g. corresponding to a ±0.5% variation in the pitch of the blades relative to the rotation required to move between fully fine and fully coarse. For example, the connection may allow a predetermined amount translation play P. This can improve assembly reliability by reducing or avoiding nut 36 rotation during the small amplitude pitch movements which may be needed to achieve continuous rotor synchrophasing and synchronisation. Indeed, the assemblies may be deliberately moved to the locked state during flight, and only moved to the free state when the blades are required to travel more than the prescribed variation towards fine. This deliberate locking can help to limit rotor overspeed and rotor drag following any failure of the actuation system 32 as there is no time delay relative to a system which requires e.g. safety logic and hydraulic valves to respond before the assemblies can move to the locked state.

The pitch lock assemblies 33 may be fastened by mounting screws 43 and breakout springs 44 to a support element 45 (e.g. an annular support ring). These screws are preloaded by the breakout springs to pull the housing 34 of the each assembly against the support element with a force that is greater than any expected opposing ball screw 39 operating frictions in the free state. Further, when the actuation system 32 moves the blades towards fine, the housing is pushed against the support element by the reaction of compression loads directly onto the support element. However, when the actuation system moves the blades towards coarse and the assembly is inadvertently in the locked state (e.g. because of a seized ball screw), the breakout springs compress, allowing the housing to move to the left, i.e. towards coarse. In this way the actuation system can continue to operate and rotor overspeed and rotor drag avoided. Preferably, however, the breakout springs are configured such that when all the assemblies are in the locked state, movement of the blades towards coarse is prevented. In this way, when all the pitch lock assemblies are functioning normally, the breakout springs do not allow unintentional pitch variation.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references mentioned above are incorporated by reference.

The invention claimed is:

1. A pitch change apparatus for a propeller assembly having a row of propeller blades which rotate around an axis of the assembly, the apparatus comprising:
   a unison ring which is coaxial with the propeller assembly, the unison ring being movable to drive respective mechanisms for varying the pitch of the blades, and
   a plurality of pitch lock assemblies circumferentially distributed around the unison ring;
   wherein each pitch lock assembly has a free state which allows movement of the unison ring and a locked state which prevents or limits movement of the unison ring and thus prevents or limits variation of the pitch of the blades, the pitch lock assembly moving from the free to the locked state when the assembly receives a signal to lock the blades.

2. A pitch change apparatus according to claim 1, wherein the pitch lock assemblies are maintained in the free state by the pressure of hydraulic fluid received from a hydraulic fluid supply, the signal to lock the blades being a drop of hydraulic pressure in the supply.

3. A pitch change apparatus according to claim 1, wherein each pitch lock assembly is mounted to a support element by a respective fastening system which allows movement of the pitch lock assembly relative to the support element, the fastening system biasing the pitch lock assembly into engagement with the support element such that, in the locked state, movement of the unison ring in a first direction corresponding to the direction of the bias is prevented by the engagement of the pitch lock assembly with the support element, while movement of the unison ring in the opposing second direction against the bias is permitted;
   whereby, if a pitch lock assembly inadvertently enters the locked state when the other pitch lock assemblies are in the free state, the locked pitch lock assembly can allow movement of the unison ring in the second direction.

4. A pitch change apparatus according to claim 3, wherein the movement of the unison ring in the second direction corresponds to variation of the pitch of the blades towards coarse.

5. A pitch lock assembly of the pitch change apparatus of claim 1.

6. A propeller assembly having a pitch change apparatus according to claim 1.

7. An engine arrangement having:
   a first propeller assembly having a pitch change apparatus according to claim 1,
   a gear assembly that drives the first assembly, and
   a power drive shaft that connects to the gear assembly at a side thereof to drive the gear assembly;
   wherein the first propeller assembly is connected to the gear assembly at said side thereof, the first propeller assembly and the pitch change apparatus being coaxial with the power drive shaft.

8. A gas turbine engine having an engine arrangement according to claim 7, the engine comprising in flow series: (i) a generator section which includes one or more turbine subsections, one or more respective generator drive shafts extending axially forwardly from the turbine subsections to one or more corresponding generator compressor subsections, and (ii) a power turbine section, the power drive shaft extending axially forwardly from the power turbine section to drive the gear assembly.

9. A pitch change apparatus for a propeller assembly having a row of propeller blades which rotate around an axis of the assembly, the apparatus comprising:
   a drive element movable to drive respective mechanisms for varying the pitch of the blades, and
   a plurality of pitch lock assemblies, each pitch lock assembly having a free state which allows movement of the drive element and a locked state which limits movement of the drive element and thus limits variation of the pitch of the blades, the pitch lock assembly moving from the free to the locked state when the assembly receives a signal to lock the blades;
   wherein each pitch lock assembly has a respective connection member which joins the pitch lock assembly to the drive element, the connection members allowing a predetermined amount of movement of the drive element relative to the connection members, the predetermined amount of movement corresponding to a predetermined amount of variation in the pitch of the blades, so that, in the free state, the pitch lock assemblies allow movement of the connection members and hence allow movement of the drive element, and, in the locked state, the pitch lock assemblies prevent movement of the connection members relative to the pitch lock assemblies and hence limit the drive element to the predetermined amount of movement.

10. A pitch change apparatus for a propeller assembly having a row of propeller blades which rotate around an axis of the assembly, the apparatus comprising:
    a unison ring which is coaxial with the propeller assembly, the unison ring being movable to drive respective mechanisms for varying the pitch of the blades, and
    a plurality of pitch lock assemblies circumferentially distributed around the unison ring;
    wherein each pitch lock assembly has a free state which allows movement of the unison ring and a locked state which prevents or limits movement of the unison ring and thus prevents or limits variation of the pitch of the blades, the pitch lock assembly moving from the free to the locked state when the assembly receives a signal to lock the blades,
    wherein each pitch lock assembly has a respective connection member which joins the pitch lock assembly to the unison ring so that, in the free state, the pitch lock assemblies allow movement of the connection members and hence allow movement of the unison ring, and
    wherein, in the locked state, the pitch lock assemblies prevent movement of the connection members relative to the pitch lock assemblies and hence prevent or limit movement of the unison ring.

11. A pitch change apparatus according to claim 10, wherein the pitch lock assemblies are maintained in the free state by the pressure of hydraulic fluid received from a hydraulic fluid supply, the signal to lock the blades being a drop of hydraulic pressure in the supply.

12. A pitch change apparatus according to claim 10, wherein the connection members, in the locked state, allow a predetermined amount of movement of the unison ring relative to the connection members, the predetermined amount of movement corresponding to a predetermined amount of variation in the pitch of the blades.

13. A pitch change apparatus according to claim 10, wherein each pitch lock assembly is mounted to a support element by a respective fastening system which allows movement of the pitch lock assembly relative to the support element, the fastening system biasing the pitch lock assembly into engagement with the support element such that, in the locked state, movement of the unison ring in a first direction corresponding to the direction of the bias is prevented by the engagement of the pitch lock assembly with the support element, while movement of the unison ring in the opposing second direction against the bias is permitted;

whereby, if a pitch lock assembly inadvertently enters the locked state when the other pitch lock assemblies are in the free state, the locked pitch lock assembly can allow movement of the unison ring in the second direction.

14. A pitch change apparatus according to claim 13, wherein the movement of the unison ring in the second direction corresponds to variation of the pitch of the blades towards coarse.

15. A pitch lock assembly of the pitch change apparatus of claim 10.

16. A propeller assembly having a pitch change apparatus according to claim 10.

17. An engine arrangement having:
a first propeller assembly having a pitch change apparatus according to claim 10,
a gear assembly that drives the first assembly, and
a power drive shaft that connects to the gear assembly at a side thereof to drive the gear assembly;
wherein the first propeller assembly is connected to the gear assembly at said side thereof, the first propeller assembly and the pitch change apparatus being coaxial with the power drive shaft.

18. A gas turbine engine having an engine arrangement according to claim 17, the engine comprising in flow series: (i) a generator section which includes one or more turbine subsections, one or more respective generator drive shafts extending axially forwardly from the turbine subsections to one or more corresponding generator compressor subsections, and (ii) a power turbine section, the power drive shaft extending axially from the power turbine section to drive the gear assembly.

19. A pitch change apparatus according to claim 10, wherein the unison ring is movable axially to drive respective mechanisms for varying the pitch of blades.

20. A pitch change apparatus according to claim 1, wherein the unison ring is movable axially to drive respective mechanisms for varying the pitch of blades.

* * * * *